United States Patent [19]

Hashimoto et al.

[11] 4,030,561

[45] June 21, 1977

[54] SAFETY KICKSTARTER FOR MOTORCYCLES

[75] Inventors: Michiyoshi Hashimoto; Hisahumi Shako, both of Asaka, Japan

[73] Assignee: Honda Giken Kogyo Kabushiki Kaisha, Tokyo, Japan

[22] Filed: Jan. 29, 1976

[21] Appl. No.: 653,636

[30] Foreign Application Priority Data

Feb. 5, 1975 Japan ............... 50-16770[U]

[52] U.S. Cl. ...................... 180/33 R; 74/594.7; 280/291
[51] Int. Cl.² ........................................ B62J 25/00
[58] Field of Search ............... 180/33 R, 30; 74/6, 74/526, 564, 594.7, 594.1; 280/291

[56] References Cited

UNITED STATES PATENTS

| | | | |
|---|---|---|---|
| 1,172,969 | 2/1916 | Fobes | 74/6 X |
| 1,350,228 | 8/1920 | Lear | 74/526 |
| 1,497,612 | 6/1924 | Sweeny | 74/526 |
| 1,532,494 | 4/1925 | James | 74/526 |

FOREIGN PATENTS OR APPLICATIONS 815,001 9/1951 Germany ............... 74/564

*Primary Examiner*—Joseph F. Peters, Jr.
*Assistant Examiner*—Terrance L. Siemens

[57] ABSTRACT

Adjacent to a retractable kickstarter on a motorcycle engine unit, there is arranged a footrest pivotable between working and retracted positions. The footrest has formed thereon a stop which when the footrest is in its working position, functions to hold the kickstarter retracted. The kickstarter can be moved to its working position for starting up the engine only after the footrest has been retracted.

4 Claims, 2 Drawing Figures

SAFETY KICKSTARTER FOR MOTORCYCLES

FIELD OF THE INVENTION

This invention relates to motorcycles and pertains more particularly to a retractable kickstarter of a motorcycle operatively associated with one of its footrests for safety purposes. It should be understood that the term "motorcycle" is used broadly herein and in the appended claims, being inclusive of motor bicycles, mopeds and other vehicles to which this invention is applicable, in addition to motorcycles in the narrower sense of the word.

BACKGROUND

For starting up a motorcycle engine unit, a kickstarter has been used extensively which consits of a lever coupled at one end to the engine unit and having an offset step at the other end, for activation by the thrust of the foot on the step. Usually, the complete kickstarter or its offset step is made pivotally retractable so as not to interfere with the movement of the rider's foot after the engine has been started up.

The kickstarter as heretofore constructed has a serious problem in connection with a pair of footrests fixedly mounted on the opposite sides of the motorcycle to provide supports for the rider's feet during its run. Since one of the footrests is located close to the kickstarter, the rider is likely to strike his foot against the footrest in the act of thrusting down the kickstarter. The result may be either the injury to rider's foot or damage to the footrest.

Another problem with the prior art retractable kickstarter is that vibrations and jolts of the travelling motorcycle can cause the kickstarter to move from its retracted to working position. This is highly objectionable because the kickstarter when in its working position constitutes a serious obstacle to the movement of the rider's foot and can distract his attention, so that in the worst case a traffic accident may result.

SUMMARY OF THE INVENTION

It is therefore the primary object of this invention to provide an improved safety kickstarter on a motorcycle associated with one of its footrests so as to overcome the above described problems of the prior art kickstarters.

Another object of the invention is to provide a retractable safety kickstarter which can be locked in its retracted position by the adjacent footrest, so that there is not possibility of the kickstarter shifting accidentally from its retracted to working position while the motorcycle is travelling.

A further object of the invention is to provide a safety kickstarter which can be activated for starting the motorcycle engine while the adjacent footrest is held retracted in such a position that the rider will not strike his foot thereagainst as he thrusts down the kickstarter.

With these and other objects in view, this invention provides a novel combination comprising a kickstarter pivotally on a motorcycle for pivotal movement between working and retracted positions, and a footrest also pivotally mounted on the motorcycle adjacent the kickstarter for pivotal movement between working and retracted positions. The kickstarter and the footrest are so interrelated that the footrest when in its working position is effective to lock the kickstarter in its retracted position. In other words, the kickstarter can be pivotally moved to its working position only when the footrest is retracted.

According to a feature of this invention, the footrest has formed thereon a stop which when the footrest is in its working position, abuts against or substantially abuts against the kickstarter for locking the same in its retracted position. Thus, during the travel of the motorcycle, when the footrest is of course in its working position, the kickstarter can be positively held retracted in spite of the inevitable vibrations and jolts of the motorcycle.

The kickstarter cannot be moved to its working position for starting up the motorcycle engine unless the footrest is retracted for unlocking the kickstarter. This arrangement is advantageous because the footrest when retracted does not interfere with the movement of the rider's foot for engaging the kickstarter for start-up of the engine.

The features which are believed to be novel and characteristic of this invention are set forth in particular in the appended claims. The invention itself, however, both as to its construction and method of operation, together with the additional objects and advantages thereof, will become apparent in the course of the following description of a preferred embodiment thereof, which is to be read in connection with the accompanying drawings in which like reference characters refer to like parts.

DESCRIPTION OF THE PREFERRED EMBODIMENT

Figure 1:
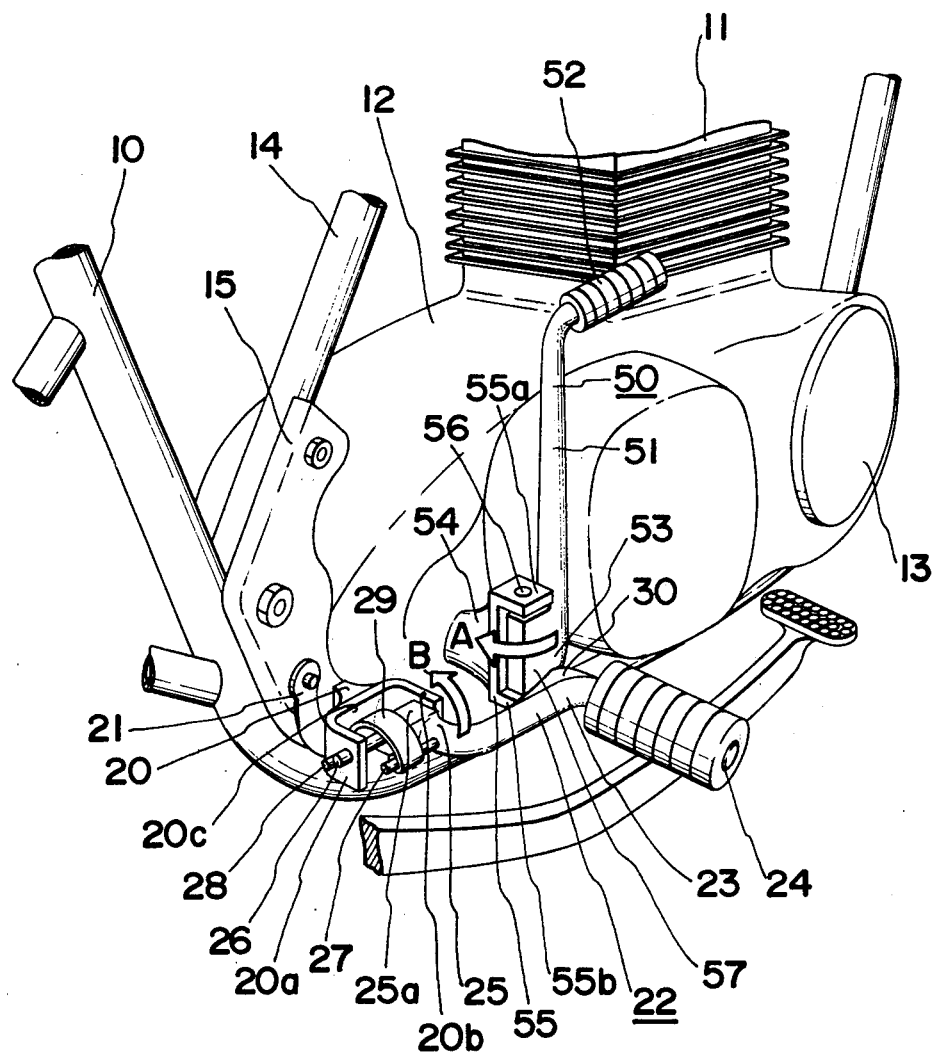
FIG. 1 is a partial perspective view of a motorcycle including a retractable safety kickstarter together with an adjacently located, retractable footrest in accordance with this invention, the view showing the kickstarter in its retracted position and the footrest in its working position, with the kickstarter being locked by the footrest.
Figure 2:
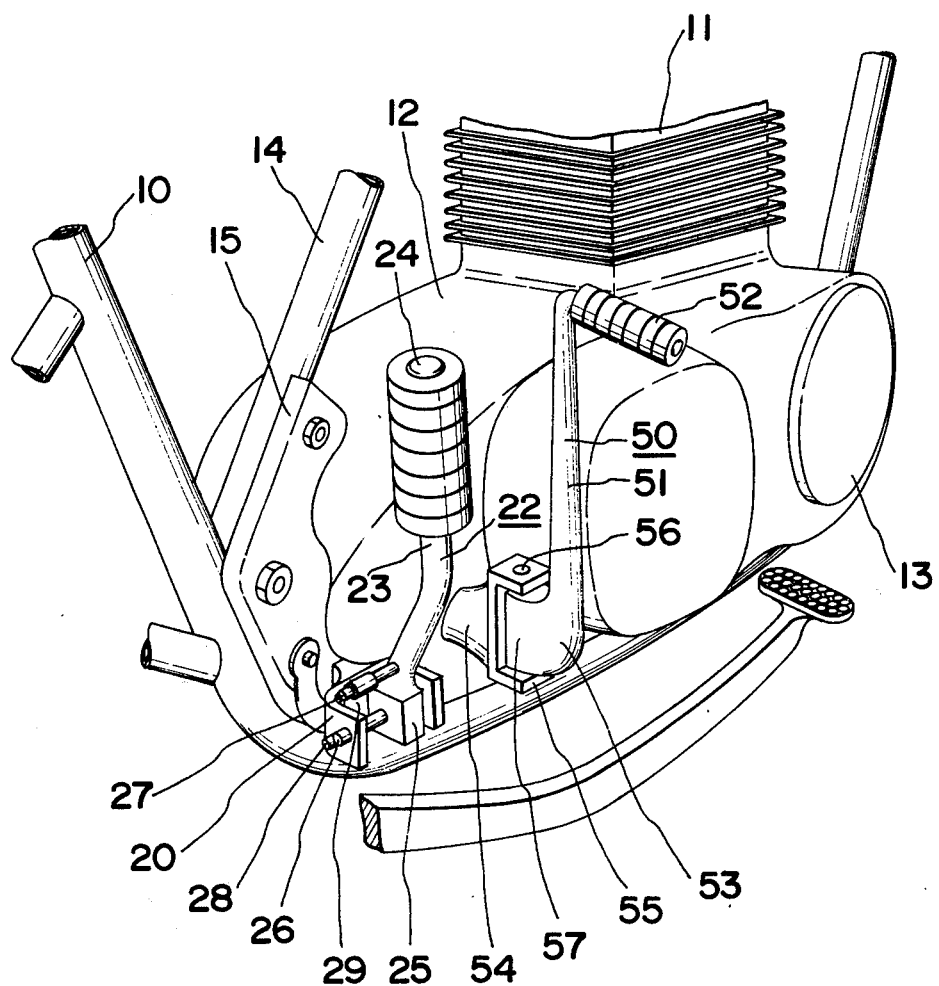
FIG. 2 is a view similar to FIG. 1 but showing the kickstarter in its working position and the footrest in its retracted position, with the kickstarter being unlocked by the footrest and ready for start-up of the motorcycle engine.

With reference to both FIGS. 1 and 2 of the accompanying drawings, there is shown at 10 a main frame of the motorcycle, preferably of steel tubing, to which is conveniently attached an engine unit comprising a cylinder block or cylinder 11, crankcase 12 and gearbox 13. The main frame 10 is provided with a bracing frame 14, also of steel tubing, and a pair of rear support plates 15 (one shown) is bolted or otherwise secured to the main and bracing frames 10 and 14 to provide additional support for the engine unit.

A footrest 22 is connected by a knuckle-joint to one of the support plates 15 for pivotal movement between a working position as shown in FIG. 1 and a retracted position shown in FIG. 2. The knuckle joint includes a U-shaped member 20 secured to the support plate 15 via a bracket 21, the joint member 20 comprising a pair of opposed walls 20a and 20b interconnected by a web 20c.

The footrest 22 of substantially crankshape has an arm 23 terminating at one end in an offset step 24, which is shown to have a covering of rubber or like material, and at the other end in a boss or enlargement 25 which is bent in a direction opposite to the offset step. The boss is rotatably fitted over a knuckle pin 26 extending between the opposed walls 20a and 20b of the joint member 20. The footrest 22 as a whole is therefore pivotable between the working and the retracted position about the axis of the knuckle pin 26, which is arranged in the longitudinal direction of the motorcycle.

The footrest 22 is shown to have a pin 27 fixedly mounted thereon adjacent boss 25 so as to be in parallel spaced relationship to the knuckle pin 26. Another pin 28 is supported between the opposed walls 20a and 20b of the joint member 20, also in parallel spaced relationship to the knuckle pin 26. These pins 27 and 28 are operatively interconnected by a leaf spring 29 which functions in the manner hereinafter described.

When the footrest 22 is pivoted upwardly through a predetermined angle from its working position of FIG. 1, the leaf spring 29 biases the footrest toward its retracted position of FIG. 2 and substantially locks the same in the FIG. 2 position. Similarly, when the footrest is pivoted downwardly through a predetermined angle from its retracted position, against the initial upward bias of the leaf spring 29, the footrest is thereby urged to, and substantially locked in, the working position of FIG. 1.

The boss 25 of the footrest 22 has a flat surface 25a, directed upwardly in FIG. 1, which is adapted to make abutting contact with the web 20c of the joint member 20 when the footrest is pivoted to the retracted position of FIG. 2. The web 20c thus serves as a stop for limiting the upward pivotal movement of the footrest 22. Although not specifically illustrated, any suitable means can be provided to limit the downward pivotal movement of the footrest 22 in the working position of FIG. 1.

Seen at 30 in FIG. 1 is a stop formed integrally with the footrest 22. The stop 30 is arranged intermediate the opposite ends of the footrest and projects inwardly therefrom, for purposes hereinafter made apparent. It will be evident that another conventional footrest (not shown) is arranged on the opposite side of the motorcycle, the unshown footrest cooperating with the retractable footrest 22 according to the invention to provide supports for the rider's feet.

Adjacent to the footrest 22 there is located a kickstarter 50 which is activated by the thrust of the rider's foot for starting up the engine 11 in the conventional manner. Also substantially crank-shaped, the kickstarter 50 comprises a lever 51 terminating at one end in an offset step 52, which is shown to have a covering of rubber or the like, and at the other end in a boss or enlargement 53 which is bent in a direction opposite to the offset step 52. The kickstarter 50 is pivotally connected at to one end to a kickstarter shaft 54 rotatably projecting laterally out of the crankcase 12.

More specifically, the kickstarter 50 is pivoted on the projecting end of the kickstarter shaft 54 via a U-shaped joint member 55 secured to the latter. The joint member 55 has a pair of opposed walls 55a and 55b supporting a pin 56 therebetween, and the kickstarter 50 has its boss 53 rotatably fitted on the pin 56. The kickstarter 50 is therefore pivotable between a retracted position of FIG. 1, in which its offset step 52 is disposed in the longitudinal direction of the motorcycle, and the working position of FIG. 2 in which its offset step is disposed in the transverse direction of the motorcycle.

It will be observed fom FIG. 1 that the boss 53 of the kickstarter 50 has a flat surface 57 which faces outwardly when the kickstarter is held retracted as in the drawing. This flat surface is adapted to be disposed opposite to the aforesaid stop 30 on the footrest 22, preferably with a minimum spacing therebetween, when the footrest is in its working position and the kickstarter 50 in its retracted position, as represented in FIG. 1.

Under the above specified conditions, therefore, the kickstarter 50 is locked in its retracted position, since its pivotal movement in the direction of the arrow A in FIG. 1 is restrained by the stop 30 on the footrest 22 in its working position. The footrest itself can be retained in its working position by the leaf spring 20. The kickstarter 50 is pivotable to its working position only after the footrest 22 has been lifted to its retracted position as in FIG. 2, whereby the kickstarter is held securely retracted in spite of the vibrations and jolts of the motorcycle which may be caused during its travel.

The surface of the stop 30 on the footrest 22 which is opposed to the flat surface 57 of the kickstarter 50 as in FIG. 1 may be flattened if some slight spacing exists therebetween as previously mentioned. It is also possible, however, to form a rounded surface on the stop 30 which makes slidable contact with the flat surface 57 of the kickstarter. In essence, the stop 30 should be capable of positively locking the kickstarter in the retracted position while permitting the footrest to be smoothly pivoted between its working and retracted positions.

For starting up the motorcycle engine by the kickstarter 50, the rider may first lift the footrest 22 by placing his toe under its offset step 24. The footrest 22 will then pivot upwardly about the knuckle pin 26, as indicated by the arrow B in FIG. 1, until the flat surface 25a of the boss 25 of the footrest rests against the web 20c of the joint member 20. The leaf spring 29 then functions to retain the footrest 22 in its retracted position of FIG. 2.

The kickstarter 50 is now pivotable to its working position about the pin 56, as indicated by the arrow A in FIG. 1. In the working position of FIG. 2, the kickstarter 50 has its offset step 52 projecting latterally outwardly of the motorcycle, so that the kickstarter can be easily displaced downwardly by the rider's foot to start up the engine. Since the footrest 22 is now held retracted as aforesaid, there is no possibility of the rider's foot striking against the footrest as the kickstarter is displaced downwardly.

Following the start-up of the engine, the kickstarter 50 may be pivoted back to its retracted position of FIG. 1. By then lowering the footrest 22 back to its working position of FIG. 1, the kickstarter 50 can be locked in its retracted position by the stop 30 on the footrest.

While the present invention has been described in terms of its specific embodiment illustrated in the accompanying drawings, it is to be understood that numerous changes and modifications may be made in the construction and arrangement of parts of the invention without departing from the spirit and scope thereof, as defined in the appended claims.

What is claimed is:

1. In a motorcycle, in combination, a kickstarter pivotally mounted on the motorcycle for pivotal movement between a working and a retracted position, and a footrest pivotally mounted on the motorcycle adjacent the kickstarter for pivotal movement between a working and a retracted position, and means on said kickstarter and footrest for permitting the kickstarter to be pivotable to its working position only when the footrest is in its retracted position, while when the footrest is in its working position the kickstarter is locked against pivotal movement to its working position.

2. The combination as set forth in claim 1, wherein said means comprises a stop on the footrest positioned such that when the footrest is in its working position, the stop is disposed in opposed relationship to the kickstarter for locking the same in its retracted position.

3. In a motorcycle, in combination, a kickstarter pivotally supported at one end on the motorcycle for pivotal movement between a working and a retracted position, a substantially crank-shaped footrest pivotally supported at one end on the motorcycle adjacent the kickstarter for pivotal movement between a working and a retracted position about an axis extending in the longitudinal direction of the motorcycle, and a stop formed on the footrest in a position intermediate the opposite ends thereof whereby when the footrest is in its working position, the kickstarter is restrained from pivotal movement to its working position.

4. The combination as set forth in claim 3, wherein the kickstarter has a flat surface portion located adjacent said one end thereof, the flat surface portion being disposed in opposed relationship to the stop on the footrest when the kickstarter is in its retracted position and the footrest in its working position.

* * * * *